Oct. 14, 1930.                H. L. BONE                1,778,519
                        RAILWAY CAR RETARDER
                        Filed June 20, 1928           2 Sheets-Sheet 1

INVENTOR:
H. L. Bone,

INVENTOR:
H. L. Bone,

Patented Oct. 14, 1930

1,778,519

UNITED STATES PATENT OFFICE

HERBERT L. BONE, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY-CAR RETARDER

Application filed June 20, 1928. Serial No. 287,008.

My invention relates to railway car retarders of the type involving a brake beam located beside a track rail and movable toward and away from the rail to engage the wheels of a car and thereby retard the motion of the car.

In retarders of this character it is desirable that the wheel engaging surface of the brake beam should contact with the wheel as far above the rail as possible, that is, as close to the wheel axle as possible, because the further above the rail this engagement of the beam takes place the greater will be the retarding effect for a given force exerted on the retarder beam. One feature of my invention is the provision of a car retarder wherein the brake beam, when it comes in contact with a car wheel, swings upwardly due to the pressure between the beam and the wheel, so that the wheel engaging surface of the brake beam rises and bears on the car wheel at a higher point than if the brake beam remained in the same horizontal plane.

I will describe several forms of car retarders embodying my invention, and will then point out the novel features thereof in claims.

Figure 1:
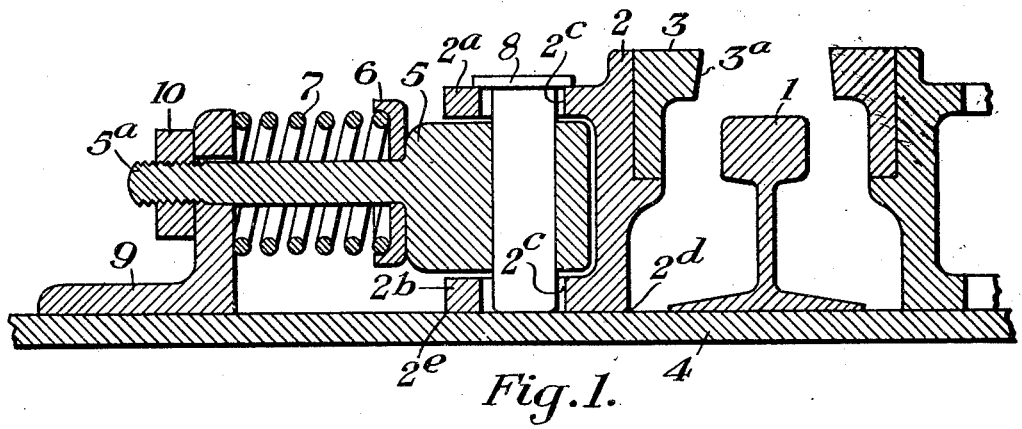
Figure 2:
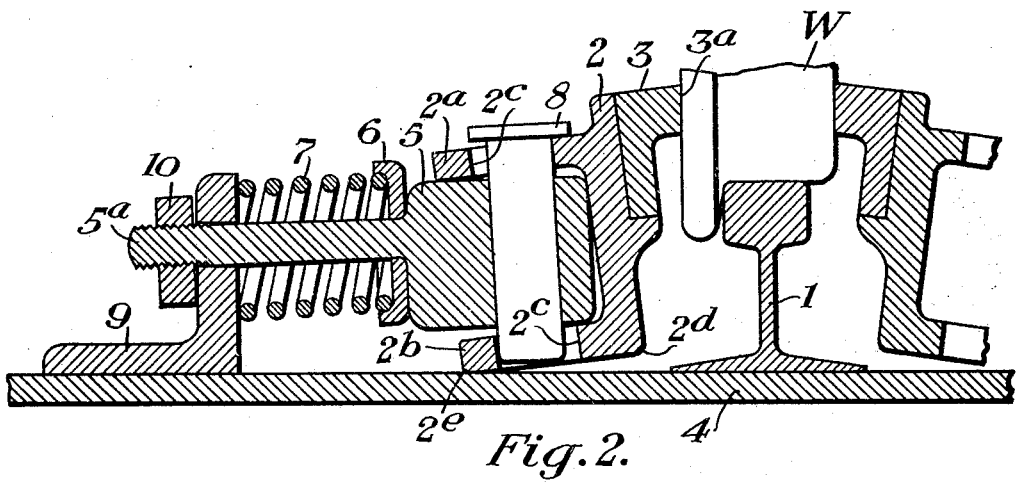
Figure 3:
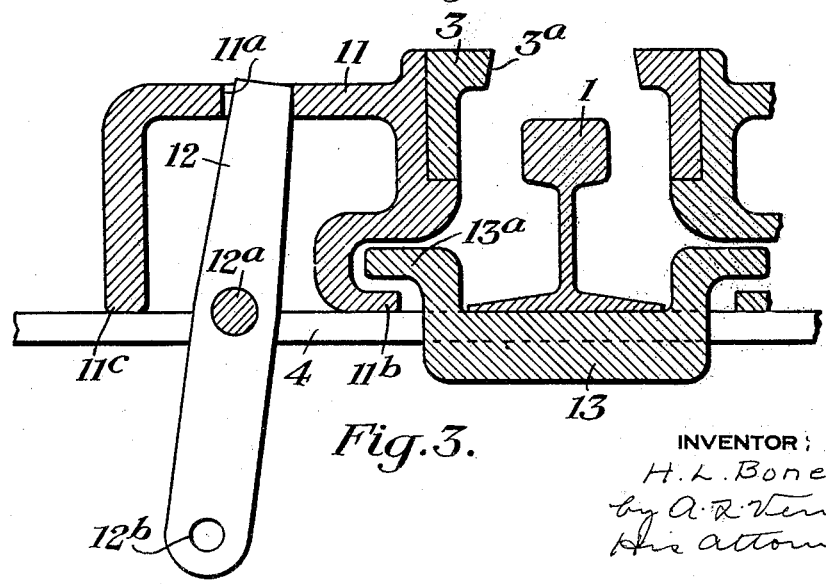
Figure 4:
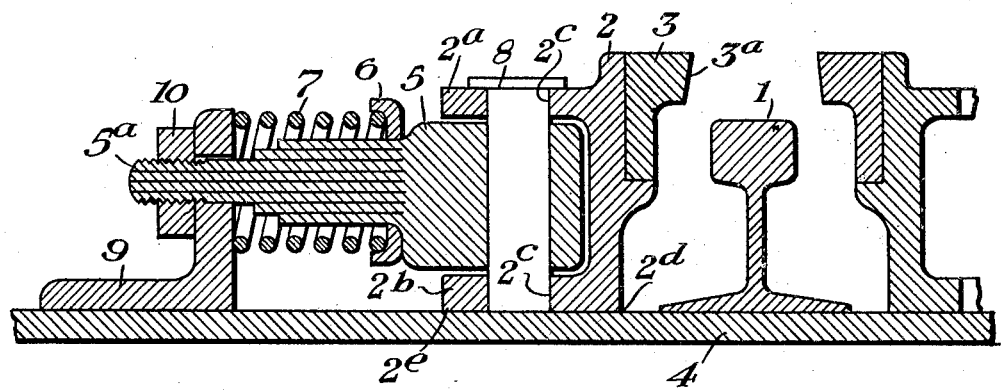
Figure 5:
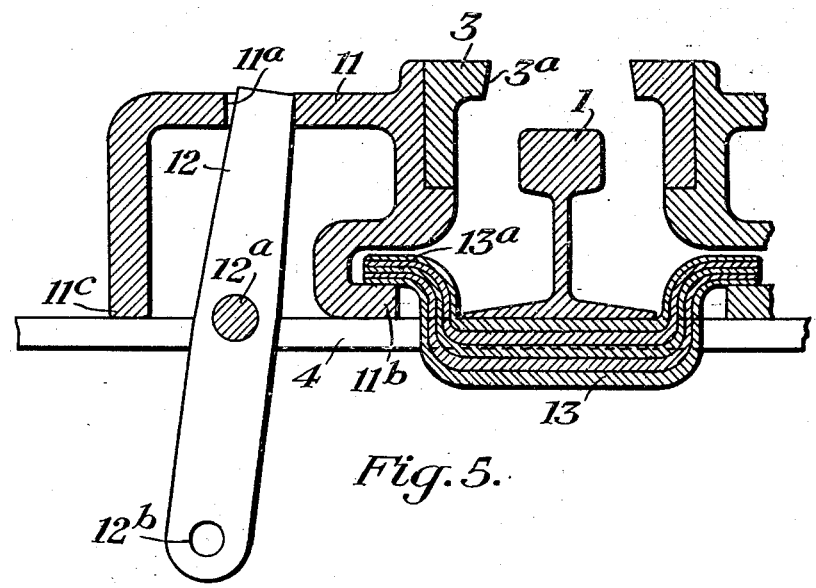

In the accompanying drawings, Fig. 1 is a transverse sectional view showing one form of car retarder embodying my invention, the parts being in the positions which they occupy when the retarder is closed but when it is not occupied by a car wheel. Fig. 2 is a view similar to Fig. 1 showing the parts in the positions they occupy when the retarder is closed and is occupied by a car wheel. Fig. 3 is a view showing another form of retarder embodying my invention. Fig. 4 is a view showing a modification of the retarder shown in Fig. 1 and embodying my invention. Fig. 5 is a view showing a modification of the retarder shown in Fig. 3 and embodying my invention.

Similar reference characters refer to similar parts in each of the several views.

Referring first to Fig. 1, the reference character 1 designates a track rail, and the reference character 2 designates the brake beam of a car retarder provided with a brake shoe 3 having a wheel-engaging surface $3^a$. The brake beam 2 slides toward and away from the rail 1 on a fixed guide or plate 4, and the brake beam is provided with two spaced horizontal arms $2^a$ and $2^b$, which arms are provided with holes $2^c$ to receive a vertical pin 8. This pin 8 passes vertically through the head of an eyebolt 5 having a shank $5^a$ which is horizontally disposed and which passes through a hole in the vertical arm of a driving angle 9. The free end of the shank $5^a$ is threaded to receive a nut 10, which bears against the outside surface of the driving angle 9. A washer 6 surrounds the shank $5^a$ and rests against the head of the eyebolt 5, and a coiled spring 7 is interposed between this washer and the vertical arm of the driving angle 9. The driving angle 9 is moved toward and away from the track rail 1 by suitable operating mechanism having nothing to do with my present invention, and it will be obvious that the motion of the driving angle is transmitted to the brake beam 2 through the spring 7, so that the brake beam is likewise moved toward and away from the track rail 1.

It will be noted that there is considerable clearance between the pin 8 and the holes $2^c$ in the brake beam 2. Normally both the toe $2^d$ and the heel $2^e$ of the brake beam 2 rest on the plate 4, but when the retarder is closed and a car wheel enters the retarder, the parts assume the positions in which they are shown in Fig. 2, wherein the reference character W designates the car wheel occupying the retarder. It will be seen from Fig. 2, that when the car wheel forces its way into the retarder, the beam 2 swings in counterclockwise direction, due to the fact that the center line of pressure between the wheel and the brake beam is above the center line of the braking force applied to the brake beam by the pin 8. The result of this movement is that the wheel-engaging surface $3^a$ contacts with the wheel at a higher point than if the brake beam 2 were to remain in the position in which it is shown in Fig. 1, with the result that a greater retarding effect is attained for a given amount of force applied to the driving angle 9.

The wheel-engaging surface $3^a$ is preferably beveled at such angle from the vertical that this surface is in a vertical plane when the beam 2 is swung into the position in which it is shown in Fig. 2, so that during the retarding operation the surface 3ª makes flat contact with the side of the car wheel.

Referring now to Fig. 3, the brake beam, which is here designated by the reference character 11, is provided with a heel 11ᶜ and a toe 11ᵇ. The toe 11ᵇ coacts with a lip 13ª on a hold-down strap 13 in such manner that when the brake beam is in the closed position the toe is under the lip 13ª, but that there is considerable clearance between the toe and the lip. The result of this is that the beam 11 can be swung in counter-clockwise direction around the heel 11ᶜ as a center to allow the wheel-engaging surface 3ª to rise vertically The amount of this angular movement of the brake beam is, of course, limited by the engagement of the toe 11ᵇ with the lip 13ª. In the form shown in Fig. 3, the brake beam 11 is provided with a slot 11ª to receive the upper end of a driving arm 12 which is pivotally mounted at an intermediate point 12ª. The lower end of the driving arm is connected at 12ᵇ with suitable operating mechanism which forms no part of my present invention.

Referring now to Fig. 4, the retarder structure shown in this view is the same as that shown in Fig. 1, except that the pin 8 makes a tight fit in the holes 2ᶜ of the brake beam 2, and the shank 5ª of the eyebolt 5 is made of spring material so that this shank may be deflected vertically to permit the brake beam 2 to swing upwardly in response to engagement with a car wheel.

Referring now to Fig. 5, the retarder structure shown in this view is the same as that shown in Fig. 3, except that the clearance between the toe 11ᵇ and the lip 13ª is eliminated and the hold-down strap 13 is made of flexible material, so that the lip 13ª may be deflected upwardly to permit the brake beam 11 to swing in counter-clockwise direction as before.

With a car retarder constructed in accordance with my invention, the brake beam when in the open position is not far enough above the rail to interfere with locomotive counterbalance weights, low bearing bolts, or other parts on the rolling stock. When the beam is in the closed or retarding position, however, and a wheel is in the retarder, the beam tips in such manner as to raise the wheel-engaging surface without materially increasing the height above the rail at the point where parts of the rolling stock might interfere. If a locomotive should go through the retarder while it is in closed position, the brake beams will be forced downwardly without damage to themselves or to the locomotive, and the same thing is true with a freight car having parts which interfere with the brake beam when it is in elevated position.

Although I have herein shown and described only a few forms of car retarders embodying my invention, it is understood that various changes and modifications may be made therein within the scope of the appended claims without departing from the spirit and scope of my invention.

Having thus described my invention, what I claim is:

1. A railway car retarder comprising a brake beam located beside a track rail and movable toward and away from the rail, and means for permitting said beam to swing so that its wheel engaging surface moves upwardly from its normal position when engaged by a car wheel.

2. A railway car retarder comprising a brake beam located beside a track rail and pivotally mounted so that its wheel engaging surface may move upwardly when engaged by a car wheel, and means for moving said beam toward and away from the track rail.

3. A railway car retarder comprising a brake beam located beside a track rail a pin passing through said beam with considerable clearance whereby the beam may be swung in a vertical plane due to engagement with a car wheel, and means for moving said pin toward and away from the track rail.

4. A railway car retarder comprising a brake beam located beside a track rail and means including a flexible member for moving said beam toward and away from the track rail, the flexibility of said member being such that the wheel engaging surface of said beam may move upwardly from its normal position due to engagement with a car wheel.

5. A car retarder brake shoe having a wheel engaging surface beveled at an angle with the vertical.

6. A car retarder brake shoe having a wheel engaging surface beveled at an angle with the vertical to form a wheel engaging surface inclined downwardly away from the rail when the shoe occupies its normal position.

7. A car retarder brake shoe adapted to be rotated upon engagement with a car wheel, said shoe being provided with a wheel engaging surface beveled in such manner that when said shoe is engaging said wheel, said surface lies in a vertical plane.

8. A railway car retarder comprising a brake beam located beside a track rail and movable toward and away from the rail, and means for permitting said beam to swing so that its wheel engaging surface moves upwardly from its normal position when engaged by a car wheel, said wheel engaging surface being beveled at such angle from the vertical that when said beam swings to its wheel-engaging position said surface is in a vertical plane.

9. A railway car retarder comprising a brake beam located beside a track rail and movable toward and away from the rail, and means for permitting said beam to swing so that its wheel engaging surface moves upwardly from its normal position when engaged by a car wheel, said wheel engaging surface being beveled in such manner that when said beam swings to its wheel engaging position said surface makes flat contact with the side of the car wheel.

In testimony whereof I affix my signature.
HERBERT L. BONE.